(12) United States Patent
Bacot et al.

(10) Patent No.: US 9,874,469 B2
(45) Date of Patent: Jan. 23, 2018

(54) METHOD AND DEVICE FOR TRACKING CONTENT OF A MOVABLE FLUID TANK

(75) Inventors: Patrick Bacot, Meudon (FR); Franck-Stephane Durtschi, Vauhallan (FR); Xavier Vigor, Paris (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 880 days.

(21) Appl. No.: 13/509,144

(22) PCT Filed: Oct. 22, 2010

(86) PCT No.: PCT/FR2010/052256
§ 371 (c)(1),
(2), (4) Date: May 10, 2012

(87) PCT Pub. No.: WO2011/058258
PCT Pub. Date: May 19, 2011

(65) Prior Publication Data
US 2012/0226451 A1 Sep. 6, 2012

(30) Foreign Application Priority Data
Nov. 10, 2009 (FR) ...................................... 09 57952

(51) Int. Cl.
*G01F 22/00* (2006.01)
*G01F 15/06* (2006.01)
*G01F 9/00* (2006.01)
*G01F 23/00* (2006.01)

(52) U.S. Cl.
CPC .............. *G01F 15/06* (2013.01); *G01F 9/008* (2013.01); *G01F 15/061* (2013.01); *G01F 22/00* (2013.01);
(Continued)

(58) Field of Classification Search
CPC ................................ G01F 22/00; G01F 15/061
(Continued)

(56) References Cited

U.S. PATENT DOCUMENTS 6,411,909 B1 * 6/2002 Charrier et al. ................ 702/45
6,831,564 B2 * 12/2004 Bair, III ............... G08B 21/182
137/14
(Continued)

FOREIGN PATENT DOCUMENTS

EP 1983251 10/2008
EP 1988327 11/2008
(Continued)

OTHER PUBLICATIONS

PCT/FR2010/052256, International Search Report, dated Jan. 21, 2011.
FR0957952, French Search Report, dated Jul. 30, 2010.

*Primary Examiner* — Ricky Ngon
(74) *Attorney, Agent, or Firm* — Elwood L. Haynes

(57) ABSTRACT

The invention relates to a device including: at least one fluid-using apparatus; at least one movable tank capable of and intended for providing at least the fluid and connected, via pipes, to the fluid using apparatus, the movable tank containing, at the outset, a given initial amount of the gas; and a means for assessing amounts of the fluid that are used by the fluid using apparatus from the movable tank, the assessment means being rigidly connected to the fluid-using apparatus.

6 Claims, 1 Drawing Sheet

(52) U.S. Cl.
 CPC ........ *G01F 23/0061* (2013.01); *Y02E 60/321* (2013.01)

(58) Field of Classification Search
 USPC .......................................................... 702/55
 See application file for complete search history.

(56) References Cited

U.S. PATENT DOCUMENTS

| | | | | |
|---|---|---|---|---|
| 7,174,769 | B2 * | 2/2007 | McSheffrey, Jr. | G08B 25/10 169/75 |
| 7,174,783 | B2 * | 2/2007 | McSheffrey, Jr. | A62C 37/50 73/291 |
| 7,441,569 | B2 * | 10/2008 | Lease | G01F 23/0069 137/558 |
| 9,041,534 | B2 * | 5/2015 | McSheffrey | A62C 13/76 340/286.07 |
| 2008/0150739 | A1 * | 6/2008 | Gamard | F17C 13/003 340/626 |
| 2008/0251077 | A1 * | 10/2008 | Durtschi et al. | 128/204.21 |
| 2010/0259406 | A1 * | 10/2010 | Caso | A61M 1/0023 340/686.6 |
| 2011/0248856 | A1 * | 10/2011 | Obenchain | 340/606 |

FOREIGN PATENT DOCUMENTS

| | | |
|---|---|---|
| WO | WO2004049237 | 6/2004 |
| WO | WO2005093377 | 10/2005 |
| WO | WO2008056082 | 5/2008 |
| WO | WO2008139081 | 11/2008 |

\* cited by examiner

METHOD AND DEVICE FOR TRACKING CONTENT OF A MOVABLE FLUID TANK

CROSS-REFERENCE TO RELATED APPLICATIONS

This application is a § 371 of International PCT Application PCT/FR2010/052256, filed Oct. 22, 2010, which claims § 119(a) foreign priority to French application 0957952, filed Nov. 10, 2009.

BACKGROUND

Field of the Invention

The invention relates to a method and a device for tracking the content of a movable fluid tank.

Fluid is understood as a liquid body, a gaseous body or a two-phase body of liquid and gas. For example, it can be an industrial gas (nitrogen, oxygen, argon, hydrogen, etc.) or a medical gas (oxygen among others). Depending on its use, this fluid is stored in a suitable tank, which can be connected to a device that uses the fluid in question. In the medical field, this device can include all means permitting administration of a gas to a patient.

A problem that arises is to know the amount of fluid contained in the tank, for example in order to anticipate the replacement thereof, or to know if there is a sufficient amount of fluid in a tank for a given application. In other words, the problem is that of establishing the autonomy of a movable tank.

Related Art

This problem is generally solved by directly measuring the amount of fluid in the tank. For example, the document WO-A-2005/093377 describes a display on the tank showing its remaining autonomy evaluated by a measurement of the internal pressure of the tank by a manometer. This solution has several disadvantages: cost of the measuring device, increased risk of leakage, which may pose a safety problem if the fluid is dangerous (for example toxic or inflammable), imprecision in the case of an evaluation of the amount by pressure measurement, lack of legibility of the result, and the bulk created by the cabling or the necessary pipes.

The document WO-A-2008/056082 describes, for its part, a medical device for gas insufflation comprising a gas outlet circuit, a connector for connecting a pressurized container in which the gas is stored, a pressure relief valve placed between the connector and the gas outlet circuit, a high-pressure sensor placed between the connector and the pressure relief valve, a flow meter placed at the outlet of the pressure relief valve. The volume of gas remaining after pressure relief is evaluated by means of the sensor and the flow meter during a release of the gas. This device also has several disadvantages. It requires pressure measurement upstream from the pressure relief valve, with the risks of leakage that this entails. It is necessary for the tank to be connected and for use of the fluid to take place in order to be able to deduce the residual content of the tank (if the latter is not connected, this determination is impossible by the method described). Finally, the method does not work if the content of the tank is in two phases, since there is then an additional degree of freedom, the amount of liquid present in the tank, that is not measured.

SUMMARY OF THE INVENTION

A technical problem that arises is to overcome all or some of the abovementioned disadvantages, that is to say in particular to make available a method and a device for tracking the content of a movable fluid tank, if appropriate for a two-phase fluid, which minimizes the costs of the measuring equipment and the risks of leakages associated with a measurement carried out on the tank, which makes it possible to track the content irrespective of whether the tank is connected or not connected to a fluid-using application, or else which makes it possible to connect the tank to a second fluid-using application without loss of information concerning its residual content.

To this end, the solution proposed by the invention concerns a device comprising:

at least one fluid-using apparatus;

at least one movable tank, which is capable of and intended for supplying at least said fluid and which is connected by conduits to said fluid-using apparatus, said movable tank containing, at the outset, a given initial amount of said gas; and means for evaluating amounts of said fluid that are used by said fluid-using apparatus and come from said movable tank, said evaluation means being integrally connected to said fluid-using apparatus;

characterized in that it additionally comprises:

a transmitter, which is integrally connected to said fluid-using apparatus and which is capable of and intended for sending, by radio waves, said amounts evaluated by said evaluation means;

a receiver, which is integrally connected to said movable tank and which is capable of and intended for receiving said amounts sent by said transmitter; and a readable memory, which is integrally connected to said movable tank and which is capable of and intended for deducting, from said given initial amount, said amounts received by said radio receiver so as to obtain a residual amount of said fluid contained in said movable tank.

The fluid-using apparatus can be of any kind compatible with a fluid supply from at least one movable tank. The fluid is used in a form that may be different than that in which it is stored, that is to say there may be a change of state of the fluid between the tank and the fluid-using apparatus. The tank can optionally contain several fluids in separate compartments.

The fluid can be any industrial gas, generally in pressurized gaseous form, or else in two phases (with a liquefied part). More particularly, the fluid can be oxygen. It can also be hydrogen. The fluid can be pure or mixed with other bodies.

The movable tank can be placed alongside, on or even inside the fluid-using apparatus. The latter can be fixed or movable. It can be a vehicle or an appliance designed to be transported.

The tank is movable in the sense that, if the device according to the invention envisions the tank as being connected to a given fluid-using apparatus, this connection has a start and an end. Before being connected to the fluid-using apparatus in question, it is possible for the tank to have been connected to another fluid-using apparatus and to have been partially emptied of the fluid in question. It will be possible, if necessary, for the tank to be connected subsequently to another fluid-using apparatus (example: tank whose autonomy is greater than the amount used by the apparatus). In another case, the tank serves for only one apparatus and is optionally replaced by another tank, for example if it is empty or considered as used (example: tank whose autonomy is less than the amount of fluid used by a fluid-using apparatus).

In the present application, an element is considered as being integrally connected to the fluid-using apparatus if, when the tank is disconnected, the element in question remains joined to the fluid-using apparatus and is not removed with the tank. Conversely, an element will be considered as being integrally connected to the tank if, when this tank is disconnected, the element remains joined to the tank. In general, the fluid-using apparatuses have one or more connection points, or connectors, to which will be connected a tube or a conduit, if appropriate a flexible conduit, coming from the tank. Seen in the direction of flow of the fluid, the elements situated downstream of the connector or connectors will be considered as being integrally connected to the apparatus, while those situated upstream will be considered as being integrally connected to the tank.

The connection between the fluid-using apparatus and the tank can be of different types depending on the fluid used and on the type of apparatus. It can comprise intermediate elements, for example a pressure relief valve, a pump, etc.

The evaluation means are typically flow meters, or else means making it possible to determine a flow rate or an amount of fluid. These means can carry out a direct measurement of one or more parameters (pressure, temperature, flow rate, etc.) making it possible to recover flow rates or amounts.

A memory is understood as a device using semiconductors and allowing information to be stored. During normal use, the memory is intended to remain fixed to the movable tank.

Moreover, according to particular embodiments, the invention can have one or more of the following features:
the device additionally has at least one display for showing said residual amount read in said memory.
During normal use, the display is intended to remain fixed to the movable tank.
said display is permanent. "Permanent" is to be understood as meaning that the display is capable of displaying said residual amount for at least three days without external energy being supplied to the display.
said display uses an electronic ink. Electronic paper (also called e-paper or electronic ink) is a technique permitting display on a generally flexible support (paper, plastic), which is modifiable electronically, seeking to imitate the appearance of a printed page, and which, like paper, does not require energy to allow a text or an image to be displayed.
said radio receiver and said memory are located in a radio label integrally connected to said movable tank.
said radio label and said display are powered by electromagnetic coupling, preferably by an inductive loop situated in said radio label. The electromagnetic coupling takes place with an element transmitting electromagnetic waves, for example a radio label reader.
said memory is capable of and intended for storing at least one information item concerning said fluid. This information item preferably concerns the name or designation of the fluid, a physical characteristic and/or a use characteristic such as a date of manufacture or date of expiry.
said receiver integrally connected to said movable tank is also a transceiver capable of and intended for transmitting, by radio waves, information contained in said memory.
said transmitter integrally connected to said fluid-using apparatus is also a transceiver capable of and intended for receiving, by radio waves, said information transmitted by said receiver.

The radio labels or radio frequency identification (RFID) tags or transponders are small labels generally affixed to or incorporated in a given object. They comprise at least one antenna associated with an electronic chip. They can receive and/or transmit signals. They can contain an identifier and various information items.

These labels can be read by a reader, an active device transmitting electromagnetic waves. The labels can comprise a device able to intercept some of the energy sent by the reader, for example an inductive loop. The labels are generally passive devices, which draw their energy solely from the energy supplied by a reader at the time of reading. According to the present invention, this energy can be supplied by the radio transmitter integrally connected to the fluid-using apparatus.

The invention also relates to a method for tracking the content of a movable tank, employing at least one apparatus that uses a fluid contained in said movable tank, said movable tank containing a given initial amount of said fluid, and said method comprising the following steps:
a) Said given initial amount of said fluid is recorded in a memory integrally connected to said movable tank;
b) At least one connection is established between said movable tank and said fluid-using apparatus;
c) Amounts of said fluid that are used by said fluid-using apparatus and come from said movable tank are evaluated on the basis of measurements carried out on said fluid-using apparatus or said connection; and
d) Said amounts are transmitted by radio waves to a receiver integrally connected to said movable tank, and, in said memory, said amounts are deducted from said initial amount so as to obtain a residual amount of said fluid contained in said movable tank, said residual amount being recorded in said memory.

The connection established in step b) is a fluid connection, that is to say intended for conveying fluid from the movable tank to the fluid-using apparatus.

The measurements carried out in step c) can in particular be measurements of flow rate, pressure or temperature. They must be able to reflect used amounts of fluid according to methods known to a person skilled in the art. They are carried out in a part integrally connected to the fluid-using apparatus.

Before or after their transmission to the receiver integrally connected to the tank, these amounts are converted into additive values so as to be able to be deducted from an initial amount. These additive amounts are preferably a mass or a volume taken under normalized temperature and pressure conditions.

The deduction performed in step d) involves subtracting a used amount of fluid from a memorized amount so as to obtain a residual amount in the tank. This therefore provides a "virtual gauge" of the tank, which indicates the residual content without any measurement being carried out on the tank itself.

Moreover, according to particular embodiments, the invention can have one or more of the following features:
the method additionally comprises a step e) in which said residual amount is displayed by means of a display integrally connected to said movable tank.
said receiver and said memory are situated in a radio label.
said radio label and said display are powered by electromagnetic coupling, preferably by induction. Said display does not necessarily consume energy permanently, but its updating may require energy.

The method additionally comprises the following steps:

a1) At least one information item concerning said fluid is recorded in said memory integrally connected to said movable tank;

d1) Said nature of said fluid is transmitted by radio waves to a receiver integrally connected to said fluid-using apparatus; and d2) Said given initial amount of said fluid is transmitted by radio waves to said receiver integrally connected to said fluid-using apparatus.

The energy supply to the radio label and the display by induction can be obtained by means of an inductive loop situated in or near these elements. The inductive loop intercepts the energy sent by the transmitter integrally connected to the fluid-using apparatus.

The tank can be equipped with a radio transmitter, which is preferably merged with the receiver. Likewise, the fluid-using apparatus can be provided with a radio receiver, which is preferably merged with the transmitter used to transmit the amounts used. In short, according to one particular embodiment, transceivers are used both on the tank and on the fluid-using apparatus. Thus, information can be exchanged from one to the other. In this way, information concerning the fluid and written in the memory integrally connected to the tank will be able to be transmitted to the fluid-using apparatus, for example in order to verify that the fluid is indeed suitable for the use envisioned. The deduction of the residual amount can be effected on the tank as well as on the fluid-using apparatus. It can be stored and/or displayed on one or the other.

BRIEF DESCRIPTION OF THE FIGURES

Other features and advantages will become clear from reading the following description in which reference is made to the figures, where.

Figure 1:
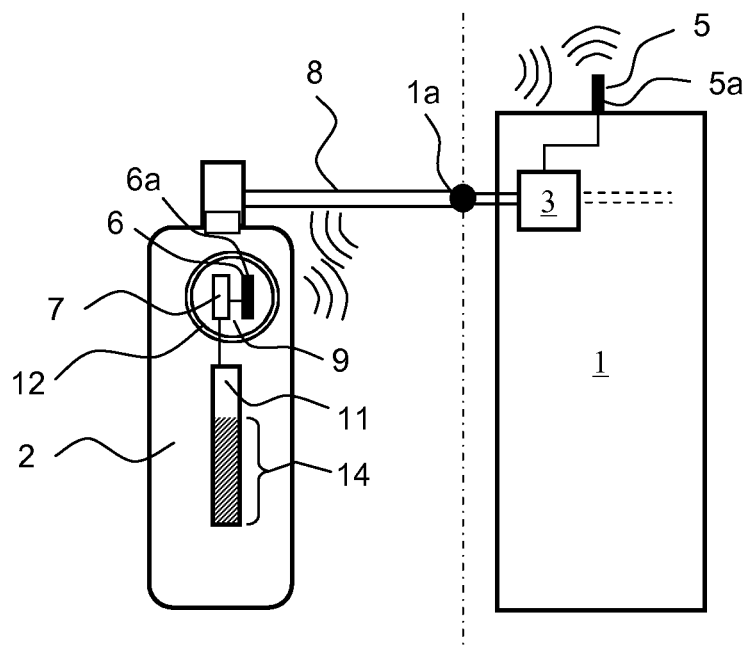
FIG. 1 shows an example of a device according to the invention.

An apparatus 1 using an industrial or medical gas is shown in FIG. 1. This gas comes from a pressurized movable tank 2 and flows through a conduit 8 which, for example, can be a flexible pipe compatible with the fluid in question. The connection is established at the point 1a, which is a connector. Everything upstream of this point is considered as being integrally connected to the tank 2. Everything downstream is considered as being integrally connected to the fluid-using apparatus 1.

DETAILED DESCRIPTION OF THE INVENTION

In the apparatus 1, an element 3 is a gas meter and measures the amount of fluid used by the apparatus 1.

These amounts are expressed in kg, for example. They are transmitted to a radio transmitter 5 integrally connected to the apparatus 1 and are sent to a receiver 6 integrally connected to the tank 2. This transmission is effected when a certain period of time has elapsed or when a certain amount of fluid has been used. These information items are deducted in a writable and readable memory 7 integrally connected to the tank 2. The memory 7 initially contains the name of the fluid contained in the tank 2 and the initial amount contained. As the fluid is used and as amounts are deducted, the "amount" information contained in the memory 7 drops, such that it represents the residual amount of fluid in the tank 2, without any actual measurement of the amount in this tank 2 having taken place. The receiver 6 and the memory 7 are located in a radio label 9 powered by an inductive loop 2 also situated in the radio label 9.

The residual amount calculated is displayed permanently by a display 11 integrally connected to the tank 2. This display uses the technique of electronic ink. A certain height 14 of ink indicates a residual amount. It is thus possible to read the residual amount directly on the display 11 or by interrogating the memory 7. The inductive loop 12 transforms the radio signal energy intercepted by it into electrical energy for the functioning of the radio label and the updating of the display 11.

The transmitter 5 is also a transceiver 5a. The receiver 6 is also a transceiver 6a. It is thus possible for data contained in the memory 7 to be sent to the fluid-using apparatus 1. For example, it is possible to verify on the apparatus 1 that the fluid contained in the tank 2 (and encoded in the memory 7) is of the desired nature. It is also possible to display on the apparatus 1 the residual amount written in the memory 7.

Figure 2:
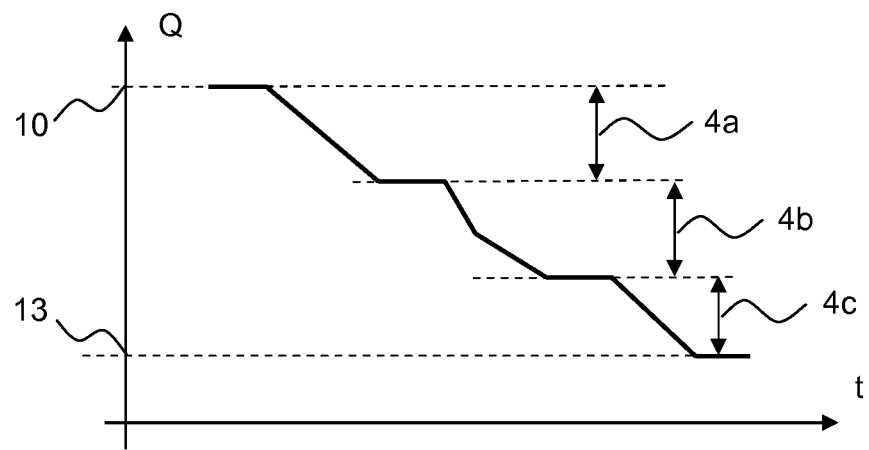
FIG. 2 is a graph illustrating the development of the amount (Q) of fluid contained in the movable tank as a function of time (t).

FIG. 2 is a graph showing the development of the amount Q of fluid in the tank 2 as a function of time t over a certain period. Initially, the amount of fluid, in kg, contained in the tank is shown by the level 10. This amount is written in the memory 7 and, if appropriate, transmitted to the apparatus 1. Then, measurements of used amounts 4a, 4b, 4c are carried out on the fluid-using apparatus 1. They are deducted from the amount of fluid written in the memory 7. After these three measurements, the level written in the memory 7 is shown by the level 13. This is therefore the actual residual fluid level contained in the tank 2.

The measurements 4a, 4b, 4c can be incremental volumes corresponding to a given use. They can also result from calculations, for example the integration of an instantaneous flow rate on a time interval. There are a great many measurement possibilities. The information deducted and the information written in the memory 7 are of the same kind, for example both in kg.

It will thus be appreciated that the advantages of the invention are in particular:

being able to verify, on a fluid-using apparatus, whether the fluid contained in the tank is suitable, being able to ascertain, by direct reading or interrogation of a memory of the radio label type, the initial and/or residual amount in a movable tank, without carrying out any intrusive measurement on the tank and in eliminating any metrology problem concerning the movable tank (for example the need to calibrate sensors), in this way limiting the risks of leaks from the tank or from the conduit upstream of the connector, reducing costs, tracking the development of the residual amount (reserve), and doing this even if the content of the tank is in two phases.

It will be understood that many additional changes in the details, materials, steps and arrangement of parts, which have been herein described in order to explain the nature of the invention, may be made by those skilled in the art within the principle and scope of the invention as expressed in the appended claims. Thus, the present invention is not intended to be limited to the specific embodiments in the given above.

What is claimed is:

1. A device comprising:
   at least one fluid-using apparatus;
   at least one movable tank, which is capable of and intended for supplying
   a means for evaluating amounts of said fluid that are used by said fluid-using apparatus and being delivered from said movable tank, said evaluation means being integrally connected to said fluid-using apparatus;
   a transmitter, which is integrally connected to said fluid-using apparatus and which is capable of and intended for sending, by radio waves, said amounts evaluated by said evaluation means;
   a receiver, which is integrally connected to said movable tank and which is capable of and intended for receiving said amounts sent by said transmitter, and
   a readable memory, which stores an initial fluid amount and which is integrally connected to said movable tank and is capable of and intended for deducting, from said given initial amount, said amounts received by said radio receiver so as to obtain a residual amount of said fluid contained in said movable tank, said radio receiver and said memory being located in a radio label integrally connected to said movable tank, and
   at least one display for showing said residual amount read in said memory, said display being integrally connected to said movable tank, said radio label and said display being powered by electromagnetic coupling.

2. The device of claim 1, wherein said radio label and said display are powered by electromagnetic coupling.

3. The device of claim 1, wherein:
   said memory is capable of and intended for storing at least one information item concerning said fluid;
   said receiver integrally connected to said movable tank is also a transceiver capable of and intended for transmitting, by radio waves, information contained in said memory; and
   said transmitter integrally connected to said fluid-using apparatus is also a transceiver capable of and intended for receiving, by radio waves, said information transmitted by said receiver.

4. A method for tracking the content of a movable tank, employing at least one apparatus that uses a fluid contained in said movable tank, said movable tank containing a given initial amount of said fluid, and said method comprising the following steps:
   a) recording said given initial amount of said fluid in a memory integrally connected to said movable tank;
   b) establishing at least one connection between said movable tank and said fluid-using apparatus;
   c) evaluating amounts of said fluid that are used by said fluid-using apparatus and come from said movable tank solely on the basis of measurements carried out on said fluid-using apparatus or said connection;
   d) transmitting said amounts by radio waves to a receiver integrally connected to said movable tank, and, in said memory, said amounts are deducted from said initial amount so as to obtain a residual amount of said fluid contained in said movable tank said residual amount being recorded in said memory;
   e) said residual amount is displayed by means of a display integrally connected to said movable tank; said receiver and said memory being situated in a radio label; and said radio label and said display being powered by electromagnetic coupling.

5. The method of claim 4, wherein:
   said radio label and said display are powered by induction.

6. The method of claim 4, further comprising:
   a1) recording at least one information item concerning said fluid in said memory integrally connected to said movable tank;
   d1) transmitting said nature of said fluid by radio waves to a receiver integrally connected to said fluid-using apparatus; and
   d2) transmitting said given initial amount of said fluid by radio waves to said receiver integrally connected to said fluid-using apparatus.

* * * * *